June 9, 1964 — S. STEIN — 3,136,123
ROCKET ENGINE INJECTOR

Filed Aug. 20, 1959 — 2 Sheets-Sheet 1

INVENTOR
SAMUEL STEIN
BY
ATTORNEY

June 9, 1964 S. STEIN 3,136,123
ROCKET ENGINE INJECTOR

Filed Aug. 20, 1959 2 Sheets-Sheet 2

INVENTOR
SAMUEL STEIN
BY
ATTORNEY

United States Patent Office 3,136,123
Patented June 9, 1964

3,136,123
ROCKET ENGINE INJECTOR
Samuel Stein, Shaker Heights, Ohio, assignor to the United States of America as represented by the Administrator of the National Aeronautics and Space Administration
Filed Aug. 20, 1959, Ser. No. 835,152
4 Claims. (Cl. 60—39.48)
(Granted under Title 35, U.S. Code (1952), sec. 266)

The invention described herein may be manufactured and used by or for the Government of the United States of America for government purposes without the payment of any royalties thereon or therefor.

The invention relates to new and useful improvements in rocket engine injectors and, more particularly, to means for feeding fuel and oxidants through an injector system into a rocket engine combustion chamber and providing adequate atomizing and mixing to insure maximum combustion efficiency.

In rocket engine injectors for introducing fuel and oxidant fluids into combustion chambers, the injectors are generally classified as to the type of method of mixing or atomizing the fluids, and are designated as impingement, spray, splash, premixing or showerhead pattern types. The impingement type of injectors consist of a number of separate holes arranged in such a manner that the resulting propellant streams of the fuel and oxidant intersect each other whereby a full stream of the fuel will impinge the oxidizer stream and break up into small droplets. In the spray ar splash types of injectors, the injectors provide conical, cylindrical, or other type of spray sheets of propellant fluids which intersect each other and thereby atomize and mix. The premixing or non-impinging injector is one wherein the fuel and the oxidizer do not impinge but mix largely by diffusion of the propellant vapors and turbulence, that is, fine particles of fuel mix with gaseous oxygen.

These prior methods of propellant mixing and atomization have certain inherent disadvantages. In the impingement type of injectors, for example, the droplet size is of considerable significance in that there is not always assurance of atomization and it is possible that the stream of oxidant will remain uncombined with the fuel or be misdirected against the combustion chamber wall. The spray, splash, and premixing type of injectors are not capable of providing the fine atomization and violent mixing which is required in order to insure proper combustion at various flow rates of the oxidant and fuel into the combustion chamber for various rocket speeds.

The present invention overcomes the disadvantages of the prior art in that good atomization and violent mixing is achieved over a wide range in flow rate of the oxidant and fuel into the combustion chamber by providing means for introducing the two fluids into the chamber whereby there is intimate mixing at the plane of entry, such mixing being achieved through turbulence and diffusion of unlike liquid stream in coaxial flow.

An object of the invention therefore is to provide an injector for a rocket engine so constructed and arranged as to permit fine atomization and good mixing of the fuel and oxidant fluids in the combustion chamber.

Another object of the invention is to provide an injector for a rocket engine wherein good mixing of the fuel and oxidant fluids is achieved with minimized possibility that the stream of oxidant will remain uncombined with the fuel or be misdirected against the combustion wall.

A still further object of the invention is to provide an injector for a rocket engine whereby a small frontal area for a given flow rate of oxidant and fuel is provided.

Another object of the invention is to provide a rocket engine injector whereby the thrust of the rocket motor can be varied over a relatively wide range by regulating the rate of flow of the propellants while insuring that good atomization and mixing of the fuels is achieved.

Other objects and advantages of the present invention will be readily appreciated as the same becomes better understood by reference to the following detailed description when considered in connection with the accompanying drawings wherein.

Figure 1:
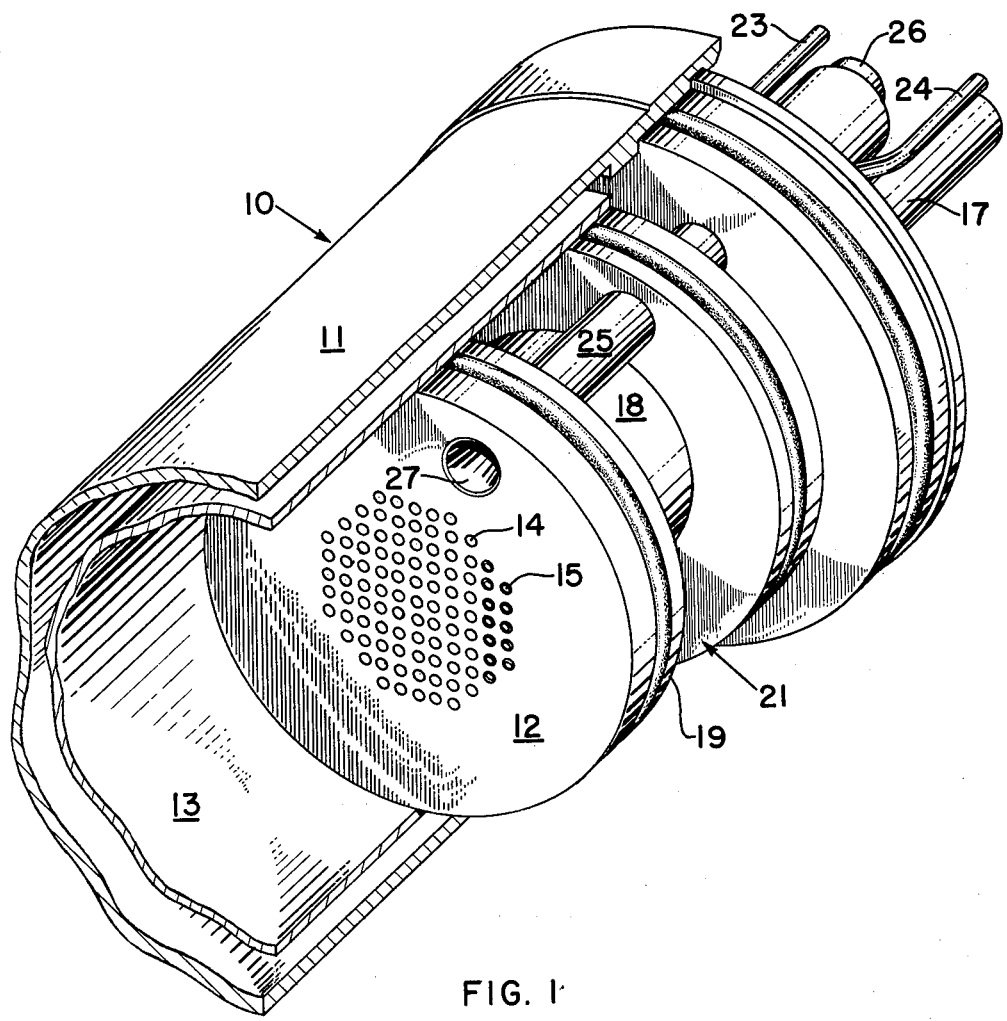
FIG. 1 is a perspective view, partially broken away, through the rocket engine combustion chamber.
Figure 2:
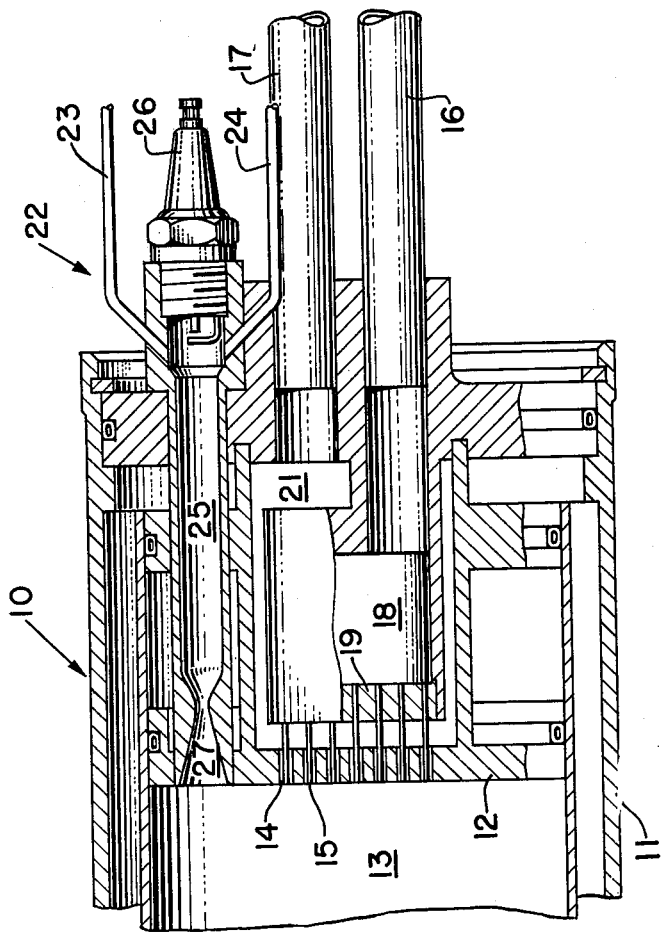
FIG. 2 is a cross-sectional side view of a rocket engine combustion chamber showing the coaxial injectors and fuel supply of the instant invention.

Referring now to the drawings and more particularly to FIGS. 1 and 2, a rocket motor 10 comprising a shell 11, injector manifold 12 forming an end wall of combustion chamber 13 is operated by passing fuel through the annular orifices 14 in the manifold 12 and oxidizer through the coaxial orifices 15 so that combustion occurs in the combustion chamber 13. Although only a few of the coaxial orifices 15 are shown in FIG. 1, it is to be understood that each orifice 14 has a coaxial orifice 15 mounted therein. The main propellant liquids are introduced through the pressurized lines 16 and 17, liquid oxygen being supplied by the line 16 into the storage chamber 18 having a forward end wall 19 with a plurality of openings which are connected by the orifices 15 with the coaxial annular fuel orifices 14. Liquid fuel is introduced into the chamber 13 through the line 17 which is in communication with a cylindrical storage chamber 21 formed by the longitudinal wall of the injector 12 that coaxially surrounds the chamber 18 and extends beyond the forward end of the chamber 18 so that a supply of liquid fuel can be forced through the annular openings 14 around the orifices 15.

The ignition of the oxidant and liquid fuel introduced into the combustion chamber 13 is provided by the igniter 22 which consists of a pair of tubes 23 and 24 for introducing into the igniter chamber 25 a fuel and oxidizer such as propane and gaseous oxygen. The mixture of the fuel and oxidizer are ignited by a spark plug device 26 commonly used in the art, and the flame emitting from the expansion portion of the nozzle 27 ignites the main propellants at the instant of their flow into the combustion chamber 13 beyond the exit plane of the injector manifold 12.

Figure 3:
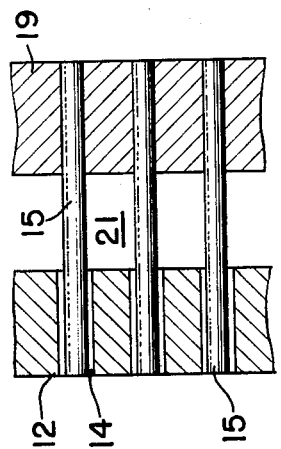
FIG. 3 is a cross-sectional enlarged view of a portion of the injector head.

With particular reference to FIG. 3 it can readily be seen that the fine atomization and violent mixing that is obtained by the instant invention is due to the passing of the fuel from the chamber 21 into the combustion chamber 13 in an annulus form which has a relatively thin wall size when passing through the orifice 14 past the orifices 15 and readily breaking up the annulus into fine droplets by the expanding inner stream of oxidant being fed into the combustion chamber through the orifices 15. In fact, in actual operation the wall thicknesses of the fuel annulus coming through the openings 14 has been in the order of 3 to 4-thousandths of an inch. Also once the oxidant and fuel has passed the exit plane of the injector plate 12 violent mixing occurs which causes further atomization of the fuel and achieves a good mixing of the oxidant and fuel in the combustion chamber whereby the possibility of the stream of oxidant remaining uncombined with the fuel or being misdirected against the chamber walls of the combustion chamber 13 has been minimized or eliminated.

It is further apparent that when the thrust of the rocket motor is varied over a relatively wide range by regulating the rate of flow of the propellants (fuel and oxidant) through the lines 16 and 17, good atomization and mixing of the fuel and oxidant is also achieved over this wide range in flow rate because the fuel annulus will be of such small thickness that the expanding force of the inner stream of oxidant will be sufficient to break up the fuel into the fine droplets and the violent mixing will occur.

The arrangement of the coaxial feeding of the liquid and oxidant into the combustion chamber requires approximately one-half the frontal area for a given flow rate of the injector manifold 12 through the jet streams than other type of injectors, thereby permitting greater latitude in the selection of pattern arrangement and spacing of the discharge orifices. Although the discharge orifices and pattern arrangement, as shown in FIGS. 1 and 2, are grouped concentrically around the longitudinal centerline of the combustion chamber, it is to be understood that the pattern arrangement could be otherwise, such as, to one side of the combustion chamber centerline. However, it has been found that by grouping the concentric orifices in the center of the rocket combustion chamber it is possible to miniaturize the rocket motors in an instance where it is desirable to study models in wind tunnels. Furthermore, by having a fuel and oxidant fed coaxially in the center of the combustion chamber, it is found that better combustion and thus better rocket thrust is obtained.

Variations and modifications are possible in the scope of the disclosure of this invention, the essence of which is the provision of a rocket motor wherein the fuel and oxidant streams are introduced into combustion chamber in parallel and coaxial streams so that atomization and violent mixing of the fuel and oxidizer results.

Obviously, many modifications and variations of the present invention are possible in the light of the above teachings. It is therefore to be understood that within the scope of the appended claims, the invention may be practiced other than as specifically described.

What is claimed:

1. In a rocket engine having a combustion chamber, an igniter, and an injector manifold having a generally planar orifice plate forming an end wall of said combustion chamber, fuel and oxidant supplying means comprising: a first conduit for supplying pressurized fuel; a passage extending through said orifice plate and communicating with said first conduit; said passage having a generally cylindrical inner surface extending between opposed faces of said orifice plate; a second conduit for supplying pressurized oxidant; a tube in said passage extending through said orifice plate and communicating with said second conduit; said tube having a generally cylindrical outer surface spaced from said cylindrical inner surface the diameter of said outer surface being slightly smaller than the diameter of said inner surface to define a fuel conducting path in the form of a thin walled annulus, and said tube terminating substantially flush with the combustion chamber face of said orifice plate whereby said tube and said passage cooperate to conduct the oxidant and fuel separately into said combustion chamber and to inject the fuel thereinto in the form of a thin walled annulus and the oxidant substantially coaxially within said annulus in the form of an expanding stream contacting and mixing with said fuel.

2. Fuel and oxidant supplying means as claimed in claim 1 in which the difference between the diameter of said inner surface and the diameter of said outer surface is of the order of six thousandths of an inch.

3. Fuel and oxidant supplying means as claimed in claim 1 in which there are a multiplicity of said passages and said tubes closely spaced together to cause intermingling of the efflux from the various passages and tubes.

4. In a rocket engine having a combustion chamber and an injector manifold having a generally planar orifice plate forming an end wall of said combustion chamber, fuel and oxidant supplying means comprising; a first conduit for supplying fuel; a passage extending through said orifice plate and communicating with said first conduit; said passage having an inner surface extending between opposed faces of said orifice plate; a second conduit for supplying oxidant; a member in said passage extending through said orifice plate and communicating with said second conduit; said member having a bore extending therethrough and an outer surface spaced from said inner surface of said passage; the spacing between said outer surface and said inner surface defining a fuel conducting path in the form of a thin walled annulus having a thickness in the order of three to four thousandths of an inch; said member terminating substantially flush with the combustion chamber face of said orifice plate whereby said member and said passage cooperate to conduct the oxidant and fuel separately into said combustion chamber and to inject a fuel thereinto in the form of a thin walled annulus and the oxidant substantially coaxially within said annulus in the form of an expanding stream contacting and mixing with said fuel.

References Cited in the file of this patent

UNITED STATES PATENTS

| | | |
|---|---|---|
| 2,470,564 | Lawrence | May 17, 1949 |
| 2,518,002 | Goddard | Aug. 8, 1950 |
| 2,540,665 | Goddard | Feb. 6, 1951 |
| 2,551,538 | Hensel | May 1, 1951 |
| 2,711,630 | Lehman | June 28, 1955 |
| 2,874,539 | Fox | Feb. 24, 1959 |
| 3,073,122 | Ledwith | Jan. 15, 1963 |

OTHER REFERENCES

An article "Coaxial-Streams Injector," page 92, of "Rocket Encyclopedia Illustrated," published April 28, 1959.